Nov. 11, 1952 V. M. SHOL 2,617,350
CAKE SAVER
Filed Sept. 16, 1949
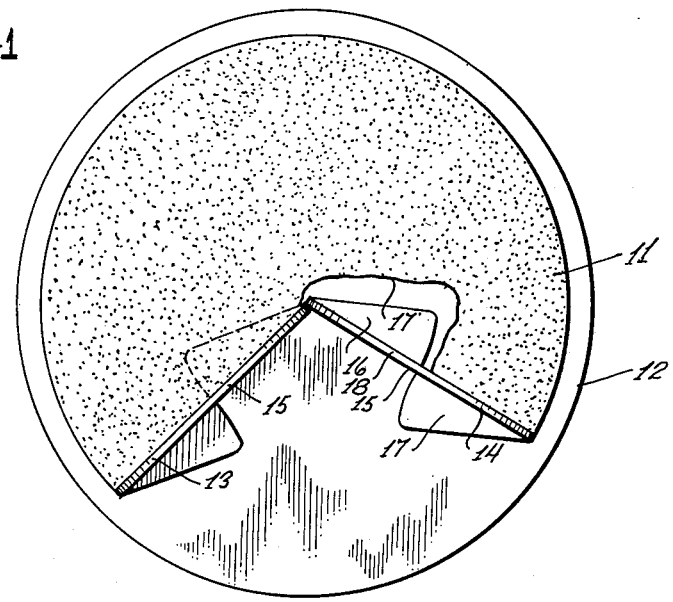
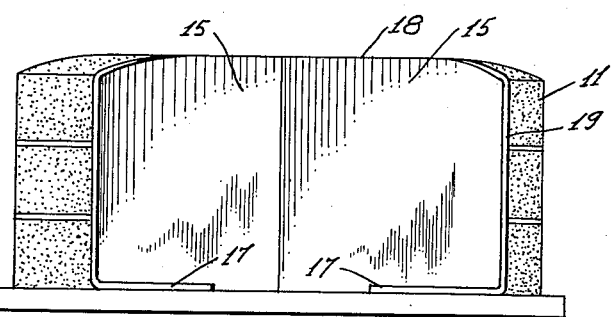
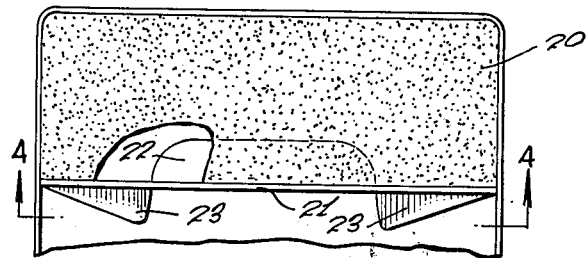
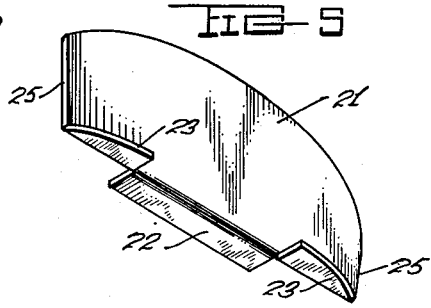
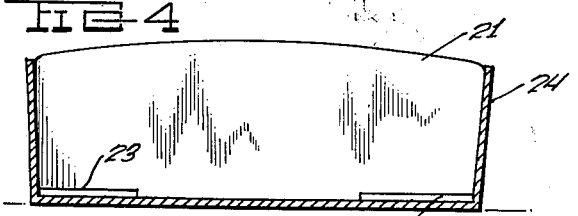
INVENTOR.
VALLIE M. SHOL
BY
McMorrow, Berman + Davidson
ATTORNEYS Patented Nov. 11, 1952

2,617,350

UNITED STATES PATENT OFFICE 2,617,350

CAKE SAVER

Vallie M. Shol, Underwood, Minn.

Application September 16, 1949, Serial No. 116,080

1 Claim. (Cl. 99—234)

This invention relates to culinary devices, and more particularly to a guard device to be used for shielding the cut surfaces of cakes and the like.

A main object of the invention is to provide a novel and improved guard device which may be applied to the cut surface of a cake to exclude air from said surface, and to prevent said surface from drying out or becoming stale.

A further object of the invention is to provide an improved shield for the cut surfaces of cakes and the like, said shield being very simple in construction, being easy to apply, being inexpensive to manufacture, and enabling cakes which have been cut to be preserved and to be maintained in a fresh condition for long periods of time.

Further objects and advantages of the invention will become apparent from the following description and claim, and from the accompanying drawings, wherein:

Figure 1 is a top plan view of a round cake, wherein the cut surfaces are shielded by the use of improved shield devices in accordance with the present invention;

Figure 2 is an elevational view of the cake of Figure 1, showing the shield devices;

Figure 3 is a fragmentary top plan view of a portion of a rectangular cake, showing the use of a modified form of a shield device according to the present invention applied to the cut surface of the cake for the purpose of preventing the cake from drying out;

Figure 4 is a cross-sectional view taken on line 4—4 of Figure 3;

Figure 5 is a perspective view of a cake shield, such as is employed in Figures 3 and 4.

Referring to the drawings, 11 designates a round cake which is supported on a round platter 12. The cake 11 is cut away radially at 13 and 14 in the usual manner, to provide portions for serving. Designated respectively at 15, 15 are a pair of vertical shield devices or plates disposed against the respective surfaces 13 and 14 and substantially sealing said surfaces against drying out. Each shield member 15 is provided with a first substantially triangular bottom flange 16 extending horizontally in one direction with respect to the body of the shield, and with a second substantially triangular bottom flange 17 extending horizontally in the opposite direction with respect to the body of the shield. As shown in Figure 1, the flanges 16 and 17 project from opposite end portions of the bottom edge of the body of the shield, and are in the same horizontal plane. The inner flange, such as the flange 16 in Figure 1, is adapted to be slipped beneath the cake, whereas the outer flange, shown at 17, bears on the platter 12 outside of the cake, whereby the body of the shield is supported in a vertical position. In Figure 1, a portion of the cake is broken away, as shown at 17', to show the shape of the flange 16. The top edge 18 of the shield member and the outer vertical edge 19 preferably conform in contour with the top contour and outside contour of the cake.

When the cake is rectangular, as shown at 20 in Figure 3, a shield 21 having substantially the same cross-sectional shape as the cake may be employed. The shield 21 is provided with an inwardly-directed, intermediate, horizontal bottom flange 22 and respective outwardly-directed end bottom flanges 23, 23 lying in the same horizontal plane as the flange 22. As shown in Figures 3 and 4, the cake 20 is positioned in a conventional pan, shown at 24, the side edges of the shield, shown at 25, 25 being downwardly and inwardly tapered to conform with the internal cross-sectional shape of the pan. The shield is positioned against the cut surface of the cake, with the intermediate, inwardly-directed flange 22 positioned beneath the cake and with the outwardly-directed flanges 23, 23 bearing on the bottom surface of the pan outside the cake. As in the embodiment of Figure 1, the bottom flanges of the shield act to support the body of the shield in a vertical position against the cut surface of the cake, whereby said surface is effectively sealed against drying out.

While certain specific embodiments of shield devices for cakes and the like have been disclosed in the foregoing description, it is to be understood that various modifications within the spirit of the invention may occur to those skilled in the art. Therefore, it is intended that no limitations be placed on the invention except as defined by the scope of the appended claim.

What is claimed is:

A cake saving device comprising an upstanding plate adapted to have one face arranged in face to face abutting relation with respect to the cut surface of a cake, a first flange projecting transversely of said one face of said plate adjacent the lower edge thereof and adapted to engage the bottom portion of said cake adjacent said cut surface, a second flange projecting transversely of the other face of said plate adjacent the lower edge of said plate and adapted to rest upon the adjacent portion of a supporting surface supporting said cake, and a third flange projecting transversely of said other face of said plate adjacent the lower edge thereof and spaced from said second flange and adapted to rest upon another adjacent portion of said supporting surface.

VALLIE M. SHOL.

REFERENCES CITED

The following references are of record in the file of this patent:

UNITED STATES PATENTS

| Number | Name | Date |
|---|---|---|
| 787,021 | Biber | Apr. 11, 1905 |
| 818,812 | Bartholomew | Apr. 24, 1906 |
| 925,489 | Lindsay | June 22, 1909 |
| 1,297,712 | Merrill | Mar. 18, 1919 |
| 1,667,994 | Smith | May 1, 1928 |
| 2,104,095 | Papendick | Jan. 4, 1938 |
| 2,502,635 | Swartz | Apr. 4, 1950 |

FOREIGN PATENTS

| Number | Country | Date |
|---|---|---|
| 692,759 | France | Aug. 5, 1930 |
| 286,552 | Germany | Aug. 12, 1915 |
| 22,863/29 | Australia | Oct. 7, 1929 |